United States Patent
Heo et al.

(10) Patent No.: US 9,036,585 B2
(45) Date of Patent: May 19, 2015

(54) TOTAL REMAINING POWER ESTIMATION IN CARRIER AGGREGATION

(75) Inventors: Youn Hyoung Heo, Hwasung-si (KR); Mo-Han Fong, Sunnyvale, CA (US); Hua Xu, Ottawa (CA); Xusheng Wei, Windsor (GB); Andrew Mark Earnshaw, Kanata (CA); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 121 days.

(21) Appl. No.: 13/816,689

(22) PCT Filed: Aug. 13, 2010

(86) PCT No.: PCT/US2010/045543
§ 371 (c)(1),
(2), (4) Date: May 6, 2013

(87) PCT Pub. No.: WO2012/021138
PCT Pub. Date: Feb. 16, 2012

(65) Prior Publication Data
US 2013/0215849 A1    Aug. 22, 2013

(51) Int. Cl.
*H04W 52/36* (2009.01)
*H04W 52/34* (2009.01)

(52) U.S. Cl.
CPC ............ *H04W 52/365* (2013.01); *H04W 52/34* (2013.01)

(58) Field of Classification Search
CPC ............ H04W 52/365; H04W 52/146; H04W 52/367
See application file for complete search history.

(56) References Cited

U.S. PATENT DOCUMENTS

2009/0175187 A1    7/2009  Jersenius et al.
2011/0038271 A1*   2/2011  Shin et al. ............ 370/252

FOREIGN PATENT DOCUMENTS

WO    2008155469 A1    12/2008

OTHER PUBLICATIONS

PCT International Search Report; Application No. PCT/US2010/045543; Sep. 7, 2011; 7 pages.
PCT Written Opinion of the International Searching Authority; Application No. PCT/US2010/045543; Sep. 7, 2011; 10 pages.
PCT Written Opinion of the International Preliminary Examining Authority; Application No. PCT/US2010/045543; Sep. 11, 2012; 8 pages.
PCT International Preliminary Report on Patentability; Application No. PCT/US2010/045543; Nov. 26, 2012; 19 pages.
3GPP TSG RAN WG1 #61bis Meeting; "Remaining Issues on Uplink Power Control"; R1-103792; Dresden, Germany; Jun. 28-Jul. 2, 2010; 6 pages.

(Continued)

*Primary Examiner* — Fan Ng
(74) *Attorney, Agent, or Firm* — Conley Rose, P.C.; J. Robert Brown, Jr.

(57) ABSTRACT

A user equipment (UE), comprising at least one component configured to send power headroom (PH) information for each of a plurality of component carriers (CCs) of a carrier aggregation, CC specific configured maximum power information for the CCs, and UE configured maximum power information, wherein the PH information for each of the CCs, the CC specific configured maximum power information for the CCs, and the UE configured maximum power information allow the access device to estimate a total remaining power for the UE.

30 Claims, 5 Drawing Sheets

(56) References Cited

OTHER PUBLICATIONS

3GPP TSG-RAN WG1 Meeting #61bis; "Per UE PHR for Carrier Aggregation"; R1-103743; Dresden, Germany; Jun. 28-Jul. 2, 2010; 4 pages.

3GPP TSG RAN WG2 #70bis; "Discussion on CC Specific PHR Reporting"; R2-103724; Stockholm, Sweden; Jun. 28-Jul. 2, 2010; 3 pages.

3GPP TSG RAN WG2 #70bis; "Parallel Transmission of Two Types PHR"; R2-103725; Stockholm, Sweden; Jun. 28-Jul. 2, 2010; 5 pages.

3GPP TSG RAN WG1 Meeting #59bis; "Uplink Power Control for LTE-A"; R1-100178; Valencia, Spain; Jan. 18-22, 2010; 4 pages.

3GPP TSG RAN WG1 Meeting #61bis; "Final Report of 3GPP TSG RAN WG1 #61 V3.0.0"; R1-104183; Dresden, Germany; Jun. 28-Jul. 2, 2010; 83 pages.

3GPP TSG RAN WG1 #61bis; "UL DMRS Aspects in Rel-10"; R1-103678; Dresden, Germany; Jun. 28-Jul. 2, 2010; 3 pages.

3GPP TSG-RAN WG1 #61; "Link Comparison of Multi-UL-ACK Transmission Schemes in Support of CA"; R1-102743; Montreal, Canada; May 10-14, 2010; 8 pages.

3GPP TS 36.101 V8.10.0; 3rd Generation Partnership Project; Technical Specification Group Radio Access Network; Evolved Universal Terrestrial Radio Access (E-UTRA); User Equipment (UE) Radio Transmission and Reception; Release 8; Jun. 2010; 161 pages.

3GPP TS 36.213 V8.8.0; 3rd Generation Partnership Project; Technical Specification Group Radio Access Network; Evolved Universal Terrestrial Radio Access (E-UTRA); Physical Layer Procedures; Release 8; Sep. 2009; 77 pages.

3GPP TS 36.331 V8.10.0; 3rd Generation Partnership Project; Technical Specification Group Radio Access Network; Evolved Universal Terrestrial Radio Access (E-UTRA); Radio Resource Control (RRC); Protocol Specification; Release 8; Jun. 2010; 211 pages.

Canadian Office Action; Application No. 2,808,148; Sep. 25, 2014; 2 pages.

\* cited by examiner

TOTAL REMAINING POWER ESTIMATION IN CARRIER AGGREGATION

CROSS REFERENCE

This application is a filing under 35 U.S.C. 371 of International Application No. PCT/US2010/045543 filed Aug. 13, 2010, entitled "Total Remaining Power Estimation in Carrier Aggregation" which is incorporated by reference herein as if reproduced in its entirety.

BACKGROUND

As used herein, the terms "user equipment" and "UE" might in some cases refer to mobile devices such as mobile telephones, personal digital assistants, handheld or laptop computers, and similar devices that have telecommunications capabilities. Such a UE might consist of a UE and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In Third Generation Partnership Project (3GPP), carrier aggregation may be used for long-term evolution (LTE) Advanced (LTE-A) radio access network (RAN) to support wider transmission bandwidths, and hence increase the potential peak data rate to meet LTE-A requirements. In carrier aggregation, multiple (e.g. up to about five) uplink CCs may be aggregated, which may be allocated in a subframe to a UE.

Figure 1:
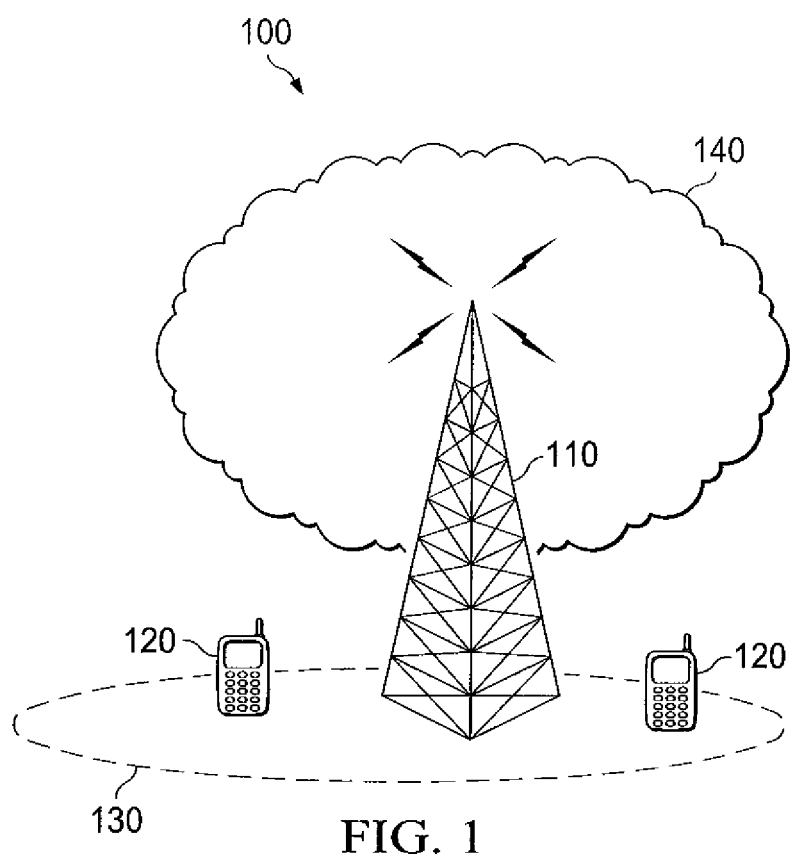
FIG. 1 is a schematic diagram of a radio access network that allows a UE to communicate with other network components and/or devices according to an embodiment of the disclosure.

FIG. 1 illustrates an embodiment of a RAN 100 that allows a UE to communicate with other network components and/or devices. The RAN 100 may be a LTE or LTE-A system, e.g. as described in 3G PP. For example, an LTE or LTE-A system might include an Evolved Universal Terrestrial Radio Access Network (E-UTRAN) evolved Node B (eNB), a wireless access point, or a similar component. FIG. 1 is exemplary and may have other components or arrangements in other embodiments. In an embodiment, the RAN 100 may comprise at least one access device 110 and at least one UE 120, which may be both located within a cell 130. The RAN 100 may also comprise or may be coupled to a network 140.

As used herein, the term "access device" refers to any component of the wireless network, such as a traditional base station, a wireless access point, or an LTE or LTE-A node B or eNB, that creates a geographical area of reception and transmission coverage allowing a UE 120 or a relay node (not shown) to access or communicate with other components in a telecommunications system, such as a second UE 120. In this document, the term "access node" and "access device" may be used interchangeably, but it is understood that an access node may comprise a plurality of hardware and software.

The access device 110 may communicate with any UE 120 within the same cell 130, via a direct link, such as in a Universal Terrestrial Radio Access Network (UTRAN). The cell 130 may be a geographical area of reception and transmission coverage. For instance, the direct link may be a point-to-point link established between the access device 110 and the UE 120 and used to transmit and receive signals between the two. Alternatively, the access devices 110 may communicate with any UE 120 in the same cell 130 over shared links, such as in an E-UTRAN. For instance, the shared links may comprise an uplink shared channel and a downlink shared channel. Additionally, the access devices 110 may communicate with other components or devices to provide for the components of the RAN 100 access to any network 140, for instance using similar or different network protocols or technologies. In an embodiment, the UEs 120 may move about between different cells 130 and their communications may be handed-over between the different cells 130, where the UEs 120 may communicate with different access devices 110.

The network 140 may be a wireless network, a wired network, or a combination of any wired or wireless networks. The networks may include a Wireless LAN (WLAN) network, an Ethernet based network, an Internet Protocol (IP) based network, a Digital Subscriber Line (DSL) network, an Optical communications network, and/or any other wireless or wired networks that may be used to exchange communications/data with the UE 120. The communications/data may comprise voice and/or video calls, emails, text/media messages (e.g. using Short Message Service (SMS) or Multimedia Messaging Service (MMS)), IP data, and/or any other data.

Figures 2, 3:
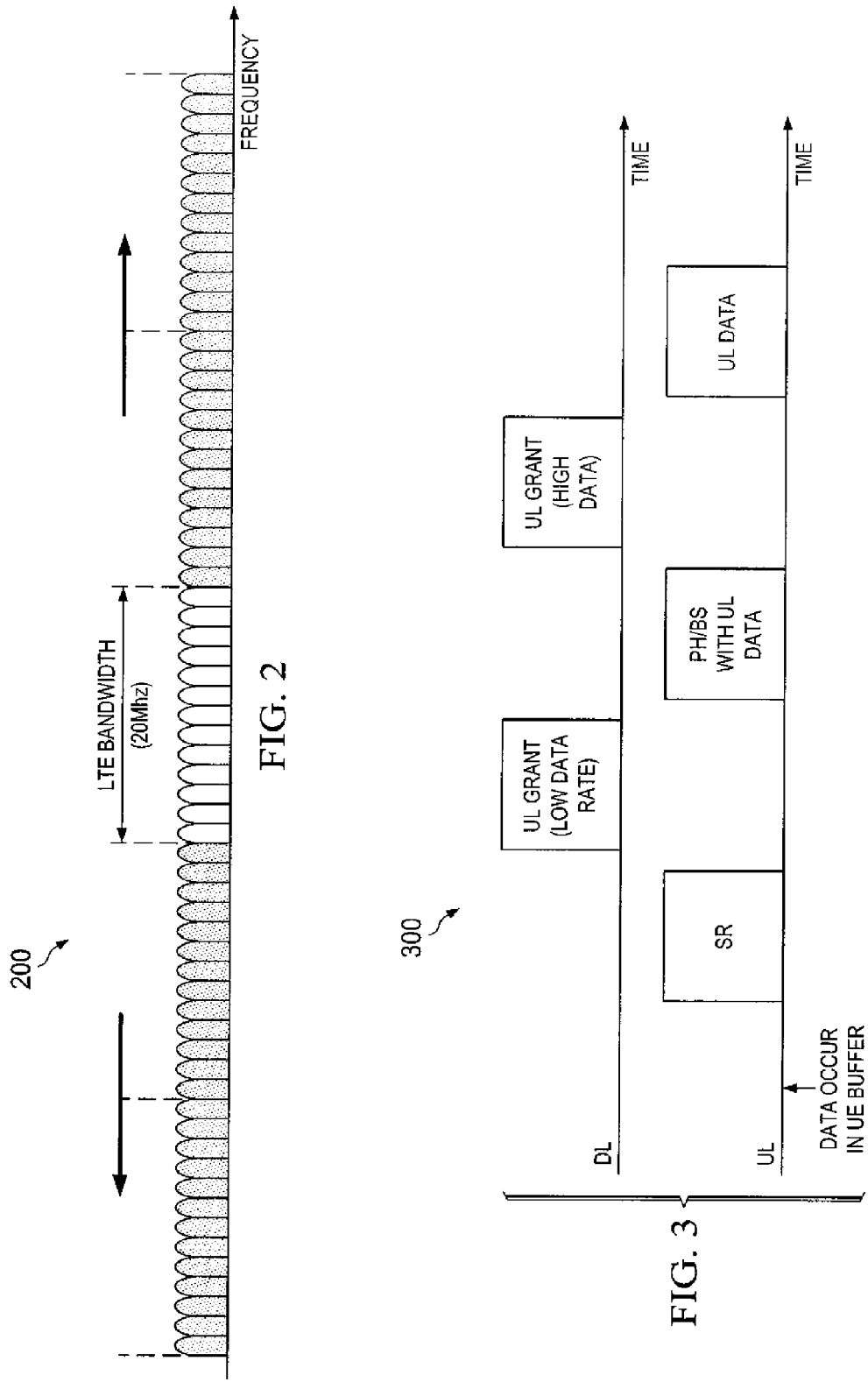
FIG. 2 is a schematic diagram of an uplink carrier aggregation for a UE according to an embodiment of the disclosure.
FIG. 3 is a schematic diagram of a flow of uplink data transmission for a UE according to an embodiment of the disclosure.

FIG. 2 illustrates an uplink carrier aggregation 200 that may be used for the UE 120 in the RAN 100. The uplink carrier aggregation 200 may comprise a plurality of CCs (e.g. about five CCs), which may be each allocated a corresponding bandwidth for the UE's transmissions (e.g. on the uplink). For example, each CC may have a bandwidth of about 20 Megahertz (MHz), and thus the total uplink system bandwidth may be equal to about 100 MHz. In other embodiments, the uplink carrier aggregation 200 may comprise fewer than about five uplink CCs, which may have different allocated bandwidths. As such, the UE 120 may transmit on any number of the CCs, e.g. depending on the UE's capabilities. Additionally, depending on the deployment scenario, the uplink carrier aggregation 200 may include carriers located in the same frequency band and/or carriers located in non-adjacent (or noncontiguous) frequency bands. For example, one carrier may be located at about two Gigahertz (GHz) band and a second non-carrier may be located at about 800 MHz band.

In uplink transmissions, the UE 120 may transmit its PHR and buffer status report (BSR) information to the access device 110 (e.g. eNB) to assist with the uplink scheduling. The PHR may indicate to the access device 110 or eNB the difference between a maximum transmission power and an actually used transmission power of the UE 120. The eNB may use this information when it determines or schedules the frequency resources and proper Modulation and Coding Scheme (MCS) level for future PUSCH transmissions.

FIG. 3 shows a flow of uplink data transmission 300 for the UE 120. For instance, when new data arrives at the UE's buffer, the UE 120 may transmit a scheduling request (SR) on the Physical Uplink Control Channel (PUCCH), e.g. if there is not an uplink PUSCH resource available for the initial transmission. In this case, since the eNB may not know the current uplink channel conditions or the amount of pending data, the eNB may schedule a relatively small amount of uplink resources for the UE 120. The UE may then transmit a PHR and BSR using this initial relatively small amount of uplink resources. Subsequently, the eNB may obtain more information for appropriate scheduling and a higher data rate may be scheduled according to the UE's buffer status and/or the observed channel conditions.

Figure 4:
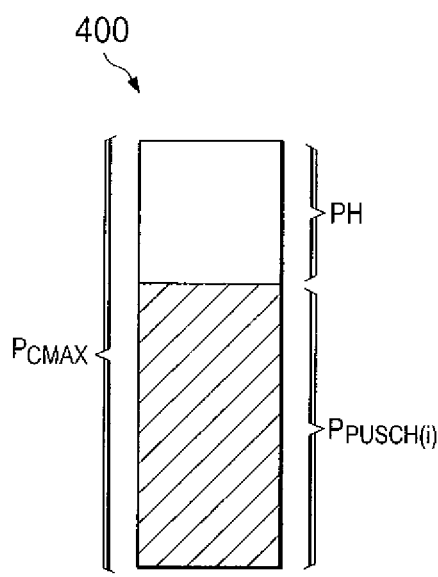
FIG. 4 is a schematic diagram of a relationship between power headroom (PH), maximum transmit power, and transmit power for Physical Uplink Shared Channel (PUSCH) transmissions for a UE according to an embodiment of the disclosure.

In LTE, PH is defined as the difference between the UE's maximum transmit power and an estimated power for PUSCH transmissions. FIG. 4 shows a relationship 400 between the PH, the maximum transmit power (PCMAX), and the transmit power for PUSCH transmissions (PPUSCH) for the UE 120. The PH value may vary, e.g. over time, depending on the current UE channel conditions. From the eNB scheduler's point of view, a larger PH value may indicate that the UE 120 has more room to increase its power to accommodate a higher data rate transmission, while a smaller PH may indicate that the UE cannot increase its data rate.

To calculate the PH value, the UE 120 may use the following equation, which is defined in 3GPP Technical Specification (TS) 36.213 section 5.1.1.2:

$$PH(i) = P_{CMAX} - P_{PUSCH}(i)$$
$$= P_{CMAX} - \left\{ \begin{array}{c} 10\log_{10}(M_{PUSCH}(i)) + P_{O\_PUSCH}(k) + \\ \alpha(k) \cdot PL + \Delta_{TF}(i) + f(i) \end{array} \right\}.$$

The equation above represents the PH as the remaining available transmission power that is obtained by subtracting the actual uplink (UL) transmission power at the i-th subframe from the maximum allowable transmission power. The parameters in the equation comprise, $P_{CMAX}$, the configured maximum UE transmission power, $M_{PUSCH}(i)$, the bandwidth of the PUSCH resource assignment expressed in number of resource blocks scheduled for subframe i, and $P_{O\_PUSCH}(k)$, a parameter composed of the sum of a cell-specific nominal component and a UE-specific component provided by higher layers. The remaining parameters comprise, PL, the downlink path loss estimate calculated in the UE in decibels (dB), $\alpha(k)$, a pathloss compensation parameter, $\Delta_{TF}(i)$, the offset with respect to the transport format, and f(i), the power control adjustment.

The PCMAX may be set within the bounds PCMAX_L=MIN{PEMAX−☐TC, PPowerClass−MPR−A-MPR−☐TC} and PCMAX_M=MIN{PEMAX, PPowerClass}. PEMAX is the value given to IE P-Max, as defined in TS 36.331. PPowerClass is the maximum UE power specified in Table 6.2.2-1 in TS 36.101, without taking into account the tolerance specified in Table 6.2.2-1. The maximum power reduction (MPR) and Additional-MPR (A-MPR) are specified in Section 6.2.3 and Section 6.2.4 in TS 36.101, respectively. ☐TC is equal to about 1.5 dB when Note 2 in Table 6.2.2-1 in TS 36.101 applies and equal to about zero dB when Note 2 in Table 6.2.2-1 does not apply.

In carrier aggregation, the UE 120 may transmit a plurality of PUSCHs in multiple UL CCs. As such, for each UL CC, independent power control (PC) may be applied. Therefore, the PC parameters used may be CC-specific. In 3GPP Release-8 (Rel-8), only one configured maximum power parameter, PCMAX, may be used to control the overall transmit power of the UE 120. However, in carrier aggregation, two kinds of maximum transmit powers may be required. The maximum transmit powers may comprise a CC-specific configured maximum power (PCMAX,j) and a UE-configured maximum power (PUEMAX). The PCMAX,j may be used to control the interference in a cell level, where the transmit power of each CC is controlled by the maximum power per CC. This power is derived in a manner similar to the manner in Rel-8. The term "j" indicates the CC-specific configured maximum power in the j-th CC. The PUEMAX may be used in addition to the CC-specific configured maximum power to consider power amplifier (PA) capability and regulatory requirements. Accordingly, the total power for the UE 120 may be restricted by the per-UE maximum power. The per-UE maximum power may be the same as the maximum power supported by the PA. However, this power may be reduced due to other reasons, such as out-of-band emission issues.

For carrier aggregation, the PHR may include CC-specific reports since the uplink transmit power in a CC may be controlled independently, e.g. due to CC dependent interference level and uplink scheduling. Accordingly, the parameters for PH calculation described may be calculated independently per CC. Thus, the PH for a j-th carrier may be defined as $PH_j(i) = P_{CMAX,j} - \{10 \log_{10} M_{PUSCH,j}(i)) + P_{O\_PUSCH,j}(k) + \alpha_j(k) \cdot PL_j + \Delta_{TF,j}(i) + f_j(i)\}$, where $P_{CMAX,j}$ is the configured maximum transmission power in the j-th CC, which may be determined by the CC-specific configured maximum transmit power. This CC-specific configured maximum power may be derived similar to the configured maximum transmission power in Rel-8. $M_{PUSCH,j}(i)$ is the bandwidth of the PUSCH resource assignment for CC j expressed in number of resource blocks scheduled for subframe $P_{O\_PUSCH,j}(k)$ is a parameter composed of the sum of a cell-specific nominal component and a UE-specific component provided by higher layers, $PL_j$ is the downlink path loss estimate for CC j calculated in the UE in dB, $\alpha_{\Box}(k)$ is a pathloss compensation parameter for CC j, $\Delta_{TF,j}(i)$ is the offset with respect to the transport format for CC j, and $f_j(i)$ is the power control adjustment for CC j.

The different uplink transmit powers among CCs may lead to different values for the remaining power in each CC, even if the maximum transmit powers per CC are the same. Additionally, the maximum transmit powers per CC may be different when different maximum allowed transmit powers are configured by the eNB or different MPR/A-MPR are applied per CC.

Further, because PUCCH and PUSCH may be transmitted about simultaneously in 3GPP Release 10 (Rel-10), a new PHR for the combined PUCCH and PUSCH power may be used. This new PHR may be used with PHR for PUSCH-only power to estimate the remaining power for PUSCH when PUCCH and PUSCH are about simultaneously transmitted. Detailed methods of transmitting per-CC PHR or the combined PUCCH and PUSCH PHR are still being discussed or developed.

Figure 5:
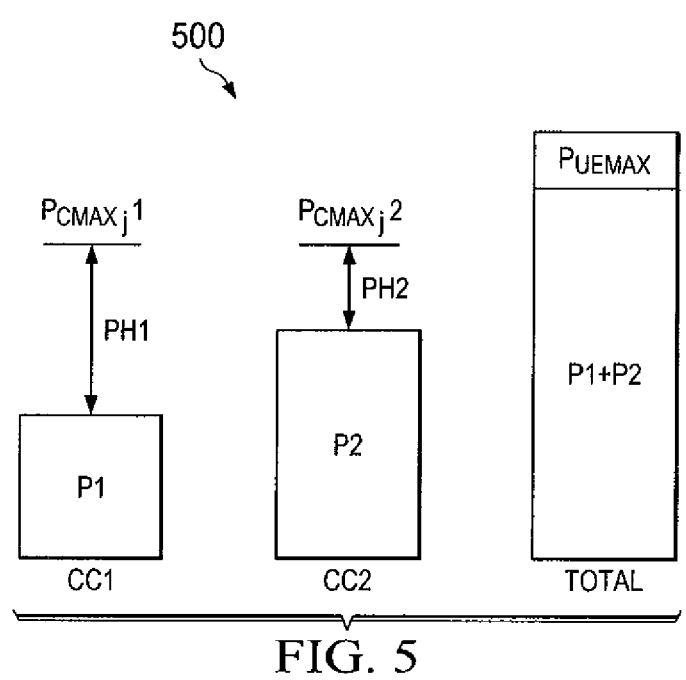
FIG. 5 is a schematic diagram of a relationship between component carrier (CC) specific power and total power for a UE according to an embodiment of the disclosure.

In some situations, when multiple CCs are transmitted, per-CC PHR may not be sufficient for the eNB to determine the remaining power for the UE 120, as discussed in 3GPP contribution R1-103792. FIG. 5 shows a relationship 500 between CC-specific power and total power for a UE. For example, according to the agreed per-CC PHR, the eNB may receive a first PH (PH1) and a second PH (PH2) reports, which may indicate the remaining power in a first CC (CC1) and second CC (CC2), respectively, by using the last equation shown above. This scheme may work properly if one CC is scheduled. However, when multiple CCs are scheduled, the total power may be controlled such that the total transmit power, e.g. P1 for CC1+P2 for CC2, does not exceed the UE maximum transmit power (PUEMAX).

FIG. 5 shows an example of the case where the total transmit power exceeds the UE maximum power. In this case, a sufficient power margin exists in each CC (e.g. at PH1 and PH2), such as in the case that only one of the CC's is scheduled. However, in the case that both CCs are scheduled about simultaneously based on the PH1 and PH2 reported for each CC, the total power may exceed the UE maximum power. Due to the limitation of the UE maximum power, the UE may scale down the total transmit power, which may degrade the uplink transmission performance. Additionally, the eNB may not be aware that this power scaling/reduction has occurred at the UE 120, and therefore may not correct or compensate for it.

Previously, two solutions have been proposed to resolve the problems/issues described above. In a first solution described in 3GPP contribution R1-103743, the UE may report to the eNB per-UE PHR that indicates the difference between the UE maximum power and the total transmit power. The per-UE PHR may be defined as: Per-UE PHR=PUEMAX−the sum of CC-specific transmit power, where PUEMAX may be a fixed value defined by UE power class. To transmit per-UE PHR, a new Media Access Control (MAC) control element (CE) may be created to carry per-UE PHR. When the UE is configured to support carrier aggregation, this per-UE PHR may be reported with per-CC PHR. In the case shown in FIG. 5, a negative PHR value may be reported to inform the eNB of the power-limited situation for the UE.

This previously proposed solution/scheme may provide UE information required to allow the eNB to calculate the power margin in terms of the total transmit power. However, this scheme may have two disadvantages. First, it may be redundant to transmit per-UE PHR whenever the UE transmits per-CC PHR, e.g. in terms of signaling overhead. The per-CC PHR is sent periodically or when the pathloss change is larger than a threshold to indicate a significant change in channel conditions. Since the channel situation for each CC is known due to per-CC PHR, it may not be necessary to transmit per-UE PHR as often as per-CC PHR. Further, per-UE PHR provides limited information because it indicates the power margin of scheduled CCs. For example, assuming there is a maximum of about five CCs, if per-UE PHR is calculated when about two CCs were scheduled, the calculated PHR may not be correct when more than about two CCs are transmitted or when other CCs (e.g. a different group of CCs) are scheduled.

In a second solution described in 3GPP contribution R1-103792, the PHR calculation may be modified so that the minimum value between per-CC PH and the per-UE PH is reported or a negative PHR is reported when the total transmit power exceeds the UE maximum power. The disadvantage of this second solution/scheme is that the eNB may not know whether the reported PH in the PHR is per-CC PH or per-UE PH. Therefore, this scheme may increase the inaccuracy of the PH value, which the eNB uses for scheduling. Additionally, within the current specifications, the absolute maximum UE transmit power (PCMAX) may not be known to the eNB with sufficiently high accuracy due to allowed maximum power reductions at the UE side (such as MPR and A-MPR), which may not be explicitly reported by the UE. As such, the eNB may not be able to derive per-UE PHR from per-CC PHRs.

Disclosed herein are methods, devices, and/or systems for allowing the eNB or any other access device 110 to estimate the total remaining power for the UE 120 and avoid at least some of the disadvantages of the previously proposed solutions/schemes. The eNB or any other access node 110 may estimate the total remaining UE transmit power to determine whether the total transmit power exceeds PUEMAX. The total remaining transmit power represents the difference between the UE maximum power and the total transmit power when the UE transmits a plurality of CCs, which may be scheduled by the eNB. The total remaining power may be estimated using the transmit power of each CC and PUEMAX. The transmit power of each CC may be derived using per-CC PHRs and PCMAX,j.

Since PCMAX,j may be subject to adjustments made by the UE 120, the system (e.g. RAN 100) may require some signaling between UE 120 and the eNB to allow the eNB to derive PCMAX. Accordingly, a first method that provides signaling of PR per CC and CPR per UE to the eNB may be used. In one embodiment, the UE 120 may send the amount of PR per CC and CPR per UE to the eNB, which may then be used by the eNB to estimate PCMAX,j and PUEMAX, respectively. In another embodiment, the UE 120 may send PCMAX,j and PUEMAX values directly to the eNB. Alternatively, a second method that transmits the per-UE PHR from the UE 120 to the eNB based on any of a plurality of triggering events may be used to avoid transmitting the per-UE PHR every time the per-CC PHRs are transmitted. The different methods and different embodiments are described in detail below.

Using the first proposed method, the eNB may estimate the total remaining power, which may be the same as the per-UE PH value proposed described for FIG. 5 above. However, unlike previous methods, the total remaining power may not be reported by the UE. The proposed method applies to UL CCs that share the same PA at the UE 120. When there are multiple PAs at the UE 120, the same proposed method or procedure may be repeated for each set of UL CCs that share the same PA.

Returning to FIG. 5, if the eNB knows the transmit powers P1, P2, and $P_{UEMAX}$, the eNB may be able to calculate the power difference between $P_{UEMAX}$ and the total transmit power, which is equal to the total remaining power. For example, the total remaining power may be defined by $$\text{total remaining power} = P_{UEMAX} - 10\log_{10}\left(\sum_{j=0}^{N} 10^{P_j/10}\right),$$

where $P_{UEMAX}$ is the UE-configured maximum power, $P_j$ is the transmit power in the j-th scheduled UL CC and N is the number of scheduled UL CCs. Because the eNB may be informed of PH of each CC, the eNB may calculate $P_j$ if the eNB knows $P_{CMAX,j}$. The transmit power of each CC may be calculated by $P_j = P_{CMAX,j} - PH_j$.

Two alternative methods may be used to inform the eNB of the configured CC-specific maximum power and PUEMAX. In a first scheme, the UE 120 may signal the PR of each CC and CPR for some or all CCs to the eNB to allow the eNB to calculate PCMAX,j and PUEMAX. In a second alternative scheme, the UE 120 may signal PCMAX,j and PUEMAX directly to the eNB. The two alternative schemes are described in detail below.

According to the first scheme, the UE 120 may send PR and CPR to the eNB or any other access node 110. The PR and CPR may be used by the eNB to estimate PCMAX,j and PUEMAX. PR may correspond to the amount of power reduction applied to the UE maximum power (PPowerClass) to determine PCMAX,j. In one embodiment, PR for CCj may be estimated at the UE 120 assuming only CCj is transmitting. For instance, without any substantial power reduction, PCMAX,j of all the CCs may be the same as the maximum UE power (PPowerClass). PCMAX,j may be different in different CCs because different PRs may be applied to the different CCs or a different PEMAX may be configured per CC. Since the eNB knows PEMAX, it may be sufficient to indicate PR to allow the eNB to calculate PCMAX,j. As described above, the highest value of the power reduction may be the sum of MPR, A-MPR, and □TC and the lowest value may be about zero, e.g. without power reduction. In Release-8, one PPowerClass value is specified. If a new PPowerClass is introduced, the UE 120 may report it as UE capability.

CPR may correspond to the amount of power reduction applied to the UE maximum power to determine the UE-specific maximum power. The CPR may be estimated at the UE 120 based on the assumption that all the configured UL CCs are scheduled, where the configuration of UL CCs may be signaled by the eNB. Alternatively, the CPR may be estimated at the UE based on the assumption that all the activated UL CCs are scheduled, where the activation/deactivation of UL CCs may be signaled by the eNB. Alternatively, the CPR may be estimated at the UE 120 based on the assumption that a defined set of UL CCs are scheduled, where the set definition is signaled by the eNB. The defined set may be the same, a subset, or different than the set of configured UL CCs or the set of activated UL CCs. Since the transmission of multiple CCs is not supported in Rel-8, additional power reduction due to multiple CCs may be defined in addition to the current MPR, A-MPR, and □TC values. Therefore, the total maximum power reduction may be larger than the amount of power reduction of each CC.

Figure 6:
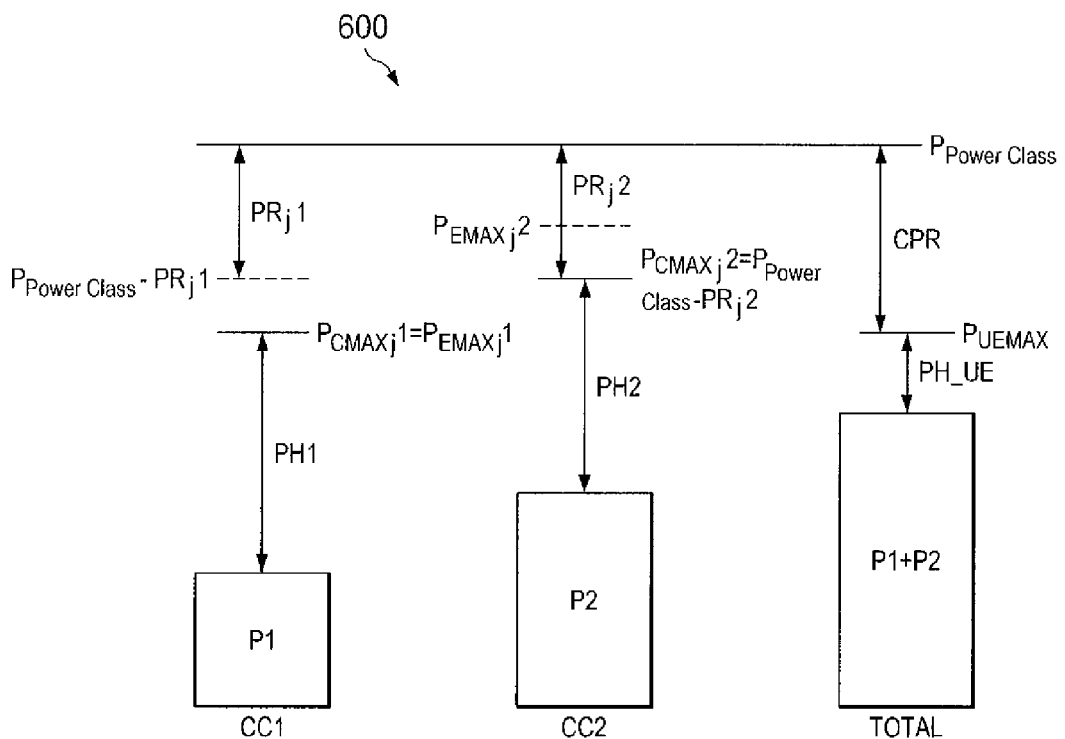
FIG. 6 is a schematic diagram of a derivation of per-UE power headroom report (PHR) using power reduction (PR) and power reduction for carrier aggregation (CPR) according to an embodiment of the disclosure.

FIG. 6 shows a derivation 600 of per-UE PHR using PR and CPR at the UE 120. The PCMAX,j and PUEMAX values may be calculated after the power is reduced with MPR, A-MPR, □TC or CPR. The MPR, A-MPR and □TC values of CC1 and CC2 may be substantially similar. However, since PCMAX,j may be dependent on or restricted by PEMAX, CC1, which has a smaller PEMAX, may also have a smaller CC-specific maximum power (Pcmax,1) than CC2, e.g. assuming the lower PEMAX is configured for CC1. Additionally, PUEMAX may be adjusted by CPR.

By using the PR of each CC and CPR, the eNB may calculate $P_{CMAX,j}$ and $P_{UEMAX}$ such as $P_{UEMAX} = P_{PowerClass} - \text{CPR}$, and $P_{CMAX,j} = P_{PowerClass} - \text{PR}_j$.

PR and CPR information that are sent to the eNB may be included in Radio Resource Control (RRC) signaling or in a MAC CE. In an embodiment, the PR value of each CC may be signaled as shown in Table 1. The range of PR may be sufficient to have power values from about zero dB to about three dB based on the current specified range. However, if a new MPR or A-MPR requirement is introduced for carrier aggregation, a larger range may be used. If the PR of each CC is substantially the same, one PR value for all CCs may be signaled.

TABLE 1

Example of signaling of PR.

| CC Number | PR value |
|---|---|
| 1 | M1 |
| 2 | M2 |
| 3 | M3 |
| 4 | M4 |
| 5 | M5 |

To signal CPR, the number of CCs assumed to be transmitting or the combination of CCs assumed to be transmitting may be considered because the CPR value may be different depending on the number of CCs or the combination of CCs. However, if CPR is signaled for all cases, the overhead may be excessive. To avoid excessive signaling overhead, the UE 120 may report one representative value to cover a plurality of cases. For example, the representative value may be the average value, the lowest value, the highest value, the median value, or any other value that the UE 120 chooses unless it is specified, e.g. by the system or operator.

In another embodiment, the UE may signal CPR information depending on the number of CCs. Table 2 shows an example of signaling CPR information when the number of CCs is about five. The range of CPR value may be defined to have a larger value range than PR because the CPR value may be larger than PR value. Additionally, the CPR may vary with the scheduled bandwidth and the carrier frequencies of the CCs, even when the same number of CCs are scheduled. In this case, one representative value may be signaled, for example the average value, the minimum value, the maximum value, or the median value, which may be predefined in the specification or specified by the eNB. In another embodiment, one CPR value may be reported, which may be based on the assumption that all the configured UL CCs are scheduled, where the configuration of UL CCs is signaled by the eNB. Alternatively, one CPR value may be reported, which may be based on the assumption that all the activated UL CCs are scheduled, where the activation/deactivation of UL CCs is signaled by the eNB. Alternatively, one CPR may be reported, which may be based on the assumption that a defined set of UL CCs are scheduled, where the set definition is signaled by the eNB. The defined set may be the same, a subset, or different than the set of configured UL CCs or the set of activated UL CCs. To reduce signaling overhead, the absolute value may be transmitted in the case that the number of CCs is about one (cm1 in Table 2) and the relative value compared to cm1 may be transmitted for other cases.

TABLE 2

Example of signaling of CPR.

| Number of CCs | CPR value |
|---|---|
| 1 | cm1 |
| 2 | cm2 |
| 3 | cm3 |
| 4 | cm4 |
| 5 | cm5 |

In an embodiment, PR and CPR information may be reported when carrier aggregation is configured. RRC signaling or MAC CE may be used to transmit the PR and CPR information. In this case, the PR and CPR for the configured CCs are transmitted when multiple CCs are configured or activated. Additionally, when a new CC is configured or activated, the PR of the new CC may be reported and the CPR value may be updated if the addition of the new CC changes the previous reported CPR value. When a previously configured or activated CC is unconfigured or deactivated, the UE may report the updated CPR value if the removal of the CC changes the previously reported CPR value.

In another embodiment, a MAC CE may be used to transmit the PR and CPR information. As such, the PR and CPR for the activated CCs may be initially transmitted. Subsequently, when a new CC is activated, the PR of the activated CC may be reported and the CPR value may be updated if the activated CC changes the previously reported CPR value. When a previously activated CC is deactivated, the UE may report the updated CPR value if the removal of the CC changes the previously reported CPR value. In another embodiment, the difference between PR and CPR may be signaled by the UE 120 because depending on the eNB implementation, the eNB may require the relative values of PHR only. In yet another embodiment, the eNB may request the UE 120 to send the PR and/or CPR via RRC signaling or MAC CE. The eNB may also request the UE to signal the PR for a particular CC or just the CPR value of the UE 120.

As described above, another scheme for enabling the eNB to calculate the total remaining power may be used, where the UE 120 may signal PCMAX,j and PUEMAX directly to the eNB. The eNB may then calculate the total remaining power using PCMAX,j and PUEMAX. For instance, PCMAX,j may be included in RRC signalling or in a MAC CE. Table 3 shows an example of the information field for PCMAX,j. For each CC, one value may be included. If PCMAX,j of each CC is about the same, then one PCMAX,j for all CCs may be signaled. To reduce signaling overhead, the differential value compared to PCMAX,j of the reference CC may be reported. The reference CC may be the UL primary CC (PCC).

TABLE 3

Example of signaling of $P_{CMAX,j}$.

| CC number | $P_{CMAX,j}$ |
|---|---|
| 1 | P1 |
| 2 | P2 |
| 3 | P3 |
| 4 | P4 |
| 5 | P5 |

Similar to CPR information, PUEMAX may be different depending on other factors, such as the number of CCs assumed to be transmitting, the combination of CCs assumed to be transmitting, and/or the scheduled bandwidth and carrier frequency of each CC. In terms of signaling, transmitting PUEMAX for all cases may add or increase signaling overhead. To avoid or reduce signaling overhead, the UE 120 may report one representative value to cover all cases. For example, the representative value may be the average value, the lowest value, the highest value, the median value, or any other value that the UE chooses unless it is specified, e.g. by the eNB, system, standard, or operator.

In another embodiment, the UE 120 may send PUEMAX depending on the number of CCs assumed to be transmitting. Table 4 shows an example of signaling PUEMAX when the number of CCs is about five. The power value may be determined with respect to the number of CCs. The power value may correspond to the expected configured maximum power when the PUSCHs in the given number of CCs are simultaneously transmitted. The PUEMAX may vary depending on the actual scheduled bandwidth and carrier frequency, although the same number of CCs may be scheduled. In this case, multiple PUEMAX may be reported depending on the frequency bandwidth. Alternatively, one representative value may be signaled, for example the average value, the minimum value, the maximum value, or the median value, which may be predefined in the specification or specified by the eNB.

TABLE 4

Example of signaling of $P_{UEMAX}$.

| Number of CCs | $P_{UEMAX}$ |
|---|---|
| 1 | Pue1 |
| 2 | Pue2 |
| 3 | Pue3 |
| 4 | Pue4 |
| 5 | Pue5 |

In another embodiment, one PUEMAX value may be reported, which may be based on the assumption that all the configured UL CCs are scheduled, where the configuration of UL CCs is signaled by the eNB. Alternatively, one PUEMAX value may be reported, which may be based on the assumption that all the activated UL CCs are scheduled, where the activation/deactivation of UL CCs is signaled by the eNB. Alternatively, one PUEMAX may be reported, which may be based on the assumption that a defined set of UL CCs are scheduled, where the set definition is signaled by the eNB. The defined set may be the same, a subset, or different than the set of configured UL CCs or the set of activated UL CCs. To reduce signaling overhead, the absolute value may be transmitted in the case where the number of CCs is about one (e.g. Pue1) and the relative value compared to Pue1 may be transmitted for other cases.

In an embodiment, PCMAX,j and PUEMAX may be required when the carrier aggregation is configured. When multiple carriers are configured or activated, the UE 120 may transmit PCMAX,j and PUEMAX information using RRC signaling. Additionally, when the new CC is configured or activated, PCMAX,j of the new CC may be reported. PUEMAX may be updated if the addition of the new CC changes the reported PUEMAX. When a previously configured or activated CC is unconfigured or deactivated, the UE may report the updated PUEMAX value if the removal of the CC changes the previously reported PUEMAX value.

In another embodiment, a MAC CE may be used to transmit PCMAX,j and PUEMAX. Accordingly, the information of only activated CCs may be transmitted in the MAC CE. In this case, when the new CC is activated, PCMAX,j of the activated CC may be reported and PUEMAX may be updated if the activated CC changes the reported PUEMAX. When a previously configured or activated CC is unconfigured or deactivated, the UE may report the updated PUEMAX value if the removal of the CC changes the previously reported PUEMAX value. In yet another embodiment, the eNB may request the UE 120 to send PCMAX,j and/or PUEMAX via RRC signaling or MAC CE.

Alternatively, a second method may be used to allow the eNB to estimate the total remaining power at the UE 120. Accordingly, a separate per-UE PHR may be reported for each PA and may be applied to the UL CCs that share the same PA and their corresponding per-UE PHR for that PA. When there are multiple PAs at the UE 120, the same proposed procedure may be repeated for each set of UL CCs that share the same PA. Although per-UE PHR is supported, the UE 120 may not always transmit per-UE PHR whenever per-CC PHR is transmitted, since the per-UE PHR may not need to indicate the pathloss change at each per-CC transmission. Instead, the pathloss change may be indicated in the reported per-CC PHR. The Per-UE PHR represents the difference between PCMAX,j and PUEMAX. Therefore, to reduce the signaling overhead in PHR, it may be beneficial to transmit per-UE PHR only when one of a plurality of events (or one of a subset of the following events) occurs.

The events may comprise a first event (Event1) where the per-CC PHR is transmitted after any secondary CC (SCC) is added or deleted, e.g. via RRC signaling. Alternatively, Event1 occurs if a MAC CE is used to activate or deactivate UL SCC. Event1 may be applied for the case when UL SCC is activated or deactivated. The events may also comprise a second event (Event2) where the UE 120 experiences a power-limited situation. A power limited situation may be defined such as when the total transmit power exceeds the UE maximum power or the per UE PHR is smaller than a threshold. The events may also comprise a third event (Event3) where the eNB requests the UE 120 to transmit per-UE PHR. This request may be transmitted using RRC signaling, MAC CE, or physical layer signaling.

The events may also comprise a fourth event (Event4) where the per-UE PHR is reported when the difference compared with the previous reported per-UE PHR is larger than a threshold value. To reduce the frequency of sending per-UE PHR, the threshold for per-UE PHR may be higher than the threshold for per CC PHR. Alternatively, the computation of the difference between the current per-UE PH and the previously reported per-UE PH, e.g. deltaper-UE PH, is such that the impact due to pathloss change is removed. In one embodiment the deltaper-UE PH='current per-UE PH'–'previously reported per-UE PH'–('current pathloss'–'pathloss when previous per UE PH was reported'). Deltaper-UE PH is then compared with a predefined or preconfigured threshold where per-UE PHR is sent when deltaper-UE PH is larger than the threshold. The events may also comprise a fifth event (Event5) where a separate timer may be configured to transmit the per-UE PHR intermittently.

In the case of per-UE PHR and per-CC PHR periodical reporting, the per-UE PHR may have a different timer than the per-CC PHR reporting. The expiration value of the per-UE PHR may be larger than the per-CC PHR. Both values may be signaled by the RRC signaling or MAC CE. In an embodiment, the per-UE PHR reporting may also occur at every M per-CC PHR reporting. For example, for every about five per-CC PHR reporting periods and/or aperiodic per-CC PHR reporting instances, the per-UE PHR may be reported once. The eNB may configure the per-UE PHR and per-CC PHR separately. For example, the eNB may disable one reporting while still enabling another reporting.

For configurations where both per-CC PHR and per-UE PHR information is to be transmitted, but not necessarily always simultaneously (e.g. per-CC PHR may be transmitted without always having to include per-UE PHR), the following options may be used to differentiate the per-CC PHR and per-UE PHR information. In a first option, a pair of one-bit flags may be used to indicate the presence or absence of both per-CC and per-UE PHR information. Two reserved bits may be available in the Rel-8 R/R/E/LCID MAC subheader for a PHR MAC CE, and both of these bits (e.g. R0 & R1) may be used for this purpose as illustrated in Table 5. The eNB may then know the length of the PHR MAC CE body based on the settings of these subheader flags.

TABLE 5

Example flag settings to indicate which PHR information is included in the PHR MAC CE.

| R0 | R1 | PHR(s) included |
|---|---|---|
| 0 | 0 | Non/Reserved/Invalid |
| 0 | 1 | Per-UE PHR only |
| 1 | 0 | Per-CC PHR only |
| 1 | 1 | Both per-CC & per-UE PHR |

For example, the PHR MAC CE body may comprise about one PH value if only a per-UE PHR was present, N PH values if only per-CC PHRs were present (assuming N UL CCs), and N+1 values if both per-CC and per-UE PHRs were present. Being able to determine the length of the MAC CE body without having to read information contained in the body may be beneficial to implement an efficient MAC protocol data unit (PDU) demultiplexer. A typical demultiplexer may scan only the MAC header, which may be composed of one or more subheaders, each with a corresponding body element (e.g. that may have a length of about zero). The demultiplexer may then construct a set of memory pointers that indicate where each body element begins within the MAC PDU. It is therefore useful that body element length information may be derived from just the MAC subheaders, either through the use of a length field, which is not present for a Rel-8 PHR MAC CE, or through the use of a fixed or known body length, which may be in this method. Further, when per-CC PHR and per-UE PHR are transmitted in the same MAC CE, the location of per-CC PHR and per-UE PHR may be predefined so that another indication is not needed. For example, per-CC PHRs of all CCs are included first and then per-UE PHR is included. The opposite order may also be used.

Some of the differences between the method described above and the proposed PHR MAC CE described in 3GPP contribution R2-103725 include using reserved bits in the PHR MAC CE body in R2-103725 while using instead bits in the subheader in the method above. R2-103725 also describes using the two reserved bits (the two most-significant bits) in each byte to specify how the remaining six bits of that byte should be interpreted. Multiple bytes (and multiple pairs of reserved bits) may be present in the PHR MAC CE body. Instead, the method above uses the two reserved bits in the subheader to specify what PHR information is included or is not included in the PHR MAC CE body. The method above also allows the length of the PHR MAC CE body to be determined by looking at the corresponding subheader. In R2-103725, the length of the PHR MAC CE body may only be determined by looking at the first byte of the body contents. This may be undesirable from the design and implementation point of view for an efficient MAC PDU demultiplexer.

In a second option, when a per-UE PHR is sent, it may always accompany per-CC PHR information, but the opposite is not necessarily true. When the eNB detects two consecutive PHR MAC CEs in the same Uplink Shared Channel (UL-SCH) MAC PDU, the first PHR MAC CE may communicate per-CC PHR information while the second PHR MAC CE may communicate per-UE PHR information. The lengths of these two PHR MAC CEs may be different, since the per-CC PHR MAC CE may contain one PH value for each UL CC, while the per-UE PHR MAC CE may contain only one PH value in total. However, the length of the per-CC PHR MAC CE may be implicitly known at the eNB (e.g. based on the number of currently configured or activated UL CCs), and therefore may not need to be explicitly signaled within the header or body of the per-CC PHR MAC CE. If the eNB detects only one PHR MAC CE in an UL-SCH MAC PDU, then that PHR MAC CE may communicate only per-CC PHR information. If this approach is used, any PHR MAC CEs may have fixed-length bodies that are known by the eNB without reading the body of the PHR MAC CE. This approach may facilitate an efficient MAC PDU demultiplexer implementation.

In Rel-8, the PHR MAC CE has a 1-byte header and a 1-byte body, with the latter containing the actual PH value (e.g. about six bits with about two reserved bits for the case of Rel-8). For carrier aggregation, the PHR MAC CE may reuse the same 1-byte header, which may not contain any length information, without the need to modify either of the two reserved bits. The body of the first PHR MAC CE in an UL-SCH MAC PDU may contain N per-CC PHR values (for N UL CCs). If a second PHR MAC CE is also found in the same UL-SCH MAC PDU, then its body may contain about one per-UE PHR value.

3GPP contribution R2-103678 proposes adding an extra one-byte F/L set of fields to the Rel-8 PHR MAC CE header to inform the eNB of the length of the PHR MAC CE body. The eNB may then use this length information to determine how much information is contained within the PHR MAC CE body, and this allows the UE to signal a variable amount of information, depending on which PHR information the UE wishes to communicate. Both of the above proposed options avoid the need to add this extra F/L information, and therefore have a plurality of advantages, such as less signalling overhead. The first option above may not require any additional MAC subheader overhead and the second option may only require about one extra byte of MAC subheader overhead when the second PHR MAC CE is included in the same MAC PDU. This per-UE PHR is expected to be transmitted less frequently than the per-CC PHR. However, R2-103678 always requires one extra byte of MAC subheader overhead.

One solution described in R2-103678 proposes using an additional UL-SCH Logical Channel ID (LCID) value to indicate that a different set of PHR information is being transmitted. However, the existing group of remaining available LCIDs (e.g. the reserved LCIDs in Rel-8) is finite, and it may not be desirable to deplete this pool of reserved LCIDs if other solutions are available. An existing Rel-8 eNB MAC PDU demultiplexer design is likely to be less impacted by the above proposed options, since the PHR MAC CE subheader format is kept identical (second proposed option) or almost identical (first proposed option) to the Rel-8 format. R2-103678 proposes adding the extra F/L set of fields to the PHR MAC CE subheader in some of its solutions, and also proposes using different LCID values (as compared to the Rel-8 PHR LCID) for communicating different PHR information, which may require a greater set of changes to an existing eNB implementation.

The proposed solutions above resolve the issue that per-CC PHR reporting may not be sufficient for the eNB to determine the remaining transmit power at the UE 120 when multiple CCs are transmitted. The methods may allow the eNB to estimate the total remaining power of the UE 120, e.g. to determine whether the total transmit power exceeds PUEMAX, using additional signaling between the UE 120 and the eNB. The actual maximum transmit power used in the methods to estimate the total remaining power of the UE 120 takes into account the power limits set by higher layers, the UE power class, and any applicable power reduction applied at the UE 120. Using the total remaining power, the eNB may schedule multiple CCs so that the total transmit power of multiple scheduled CCs does not exceed PUEMAX. As such, the UE's available transmit power may be better utilized.

Additionally, the probability of events in which the eNB requests more transmit power than is available at the UE 120 may be reduced, thereby avoiding instances in which power scaling must be applied and/or avoiding any associated performance degradation. A further benefit, e.g. compared to per-UE PH reporting by the UE 120, is that reporting when the channel situation changes may not be needed, since the communicated information using the methods above is not affected by the pathloss. The communicated information may be signaled when CCs are (re)configured or activated. Therefore, the signaling overhead may be reduced. Additionally, using the proposed triggering method and the MAC CE for per-UE PHR, per-UE PHR may be reported less often than the per-CC PHR, e.g. when needed. Thus, the signaling overhead for transmitting per UE PHR may be reduced.

Figure 7:
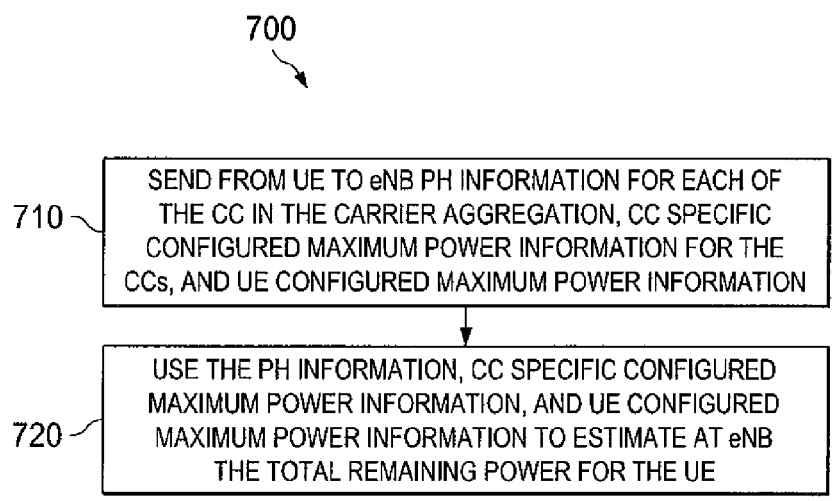
FIG. 7 is a flowchart of a method for allowing an access device to estimate a total remaining power for a UE according to an embodiment of the disclosure.

FIG. 7 illustrates an embodiment of a method 700 for allowing the eNB or any other access device 110 to estimate the total remaining power for the UE 120, which uses carrier aggregation. At step 710, the UE 120 may send PH information for each of the CC in the carrier aggregation, CC specific configured maximum power information for the CCs, and UE configured maximum power information to an eNB. For instance, the UE 120 may send a CC configured maximum power (PCMAX,j) for each of the CCs and a UE configured maximum power (PUEMAX), via RRC signaling, physical layer signaling, or in a MAC CE. Alternatively, the UE 120 may send PR per CC and CPR per UE, via RRC signaling, physical layer signaling, or in a MAC CE.

At step 720, the eNB may use the PH information, CC specific configured maximum power information, and UE configured maximum power information to estimate the total remaining power for the UE. For instance, the eNB may use PCMAX,j for each of the CCs and PUEMAX values to estimate the total remaining power for PUSCH transmissions (PPUSCH) for the UE 120. Alternatively, the eNB may use PR per CC and CPR per UE values to estimate PCMAX,j for each of the CCs and PUEMAX values and subsequently estimate PPUSCH.

Figure 8:
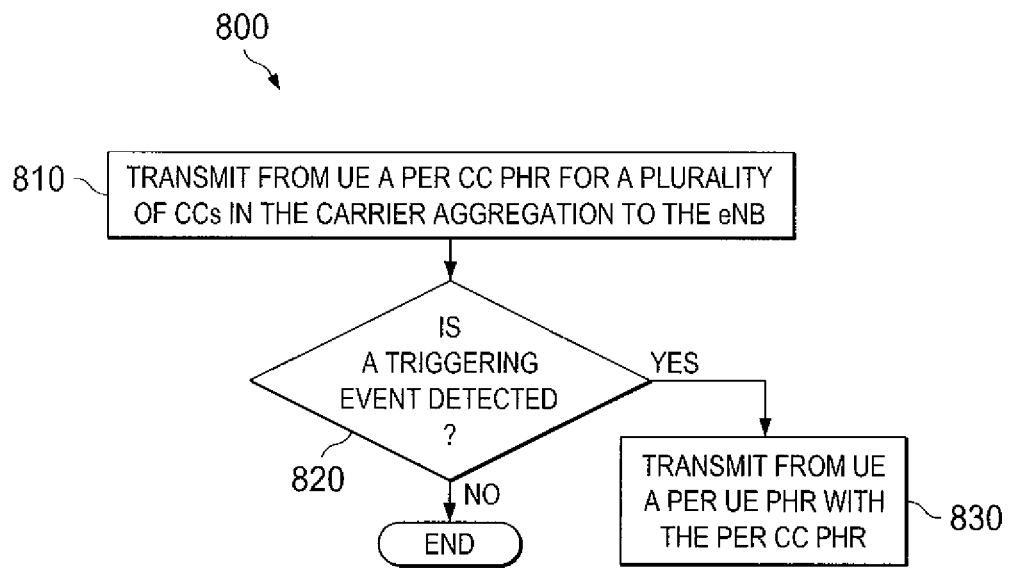
FIG. 8 is a flowchart of another method for transmitting per CC and per UE PHR at a UE according to an embodiment of the disclosure.

FIG. 8 illustrates an embodiment of another method 800 for transmitting per CC and per UE PHR at the UE 120, which uses carrier aggregation. At step 810, the UE 120 may transmit a per CC PHR for a plurality of CCs in the carrier aggregation to the eNB. At step 820, the UE 120 may verify whether a triggering event is detected, as described above. If any of the triggering events above or other specified events is detected then the method 800 may proceed to step 830. Otherwise, the method may end. At step 830, the UE 120 may transmit a per UE PHR with the per CC PHR. As such, when the eNB receives a per UE PHR, the eNB also receives at least one transmitted per CC PHR. Thus the eNB may use both the per CC PHR and the per UE PHR to estimate the total remaining power for the UE 120. By detecting the triggering event before sending the per UE PHR to the eNB, the method 800 may reduce the signaling load of the UE 120. Alternatively, the per UE PHR may be transmitted separately from the per CC PHR. In this case, step 810 may be skipped.

Figure 9:
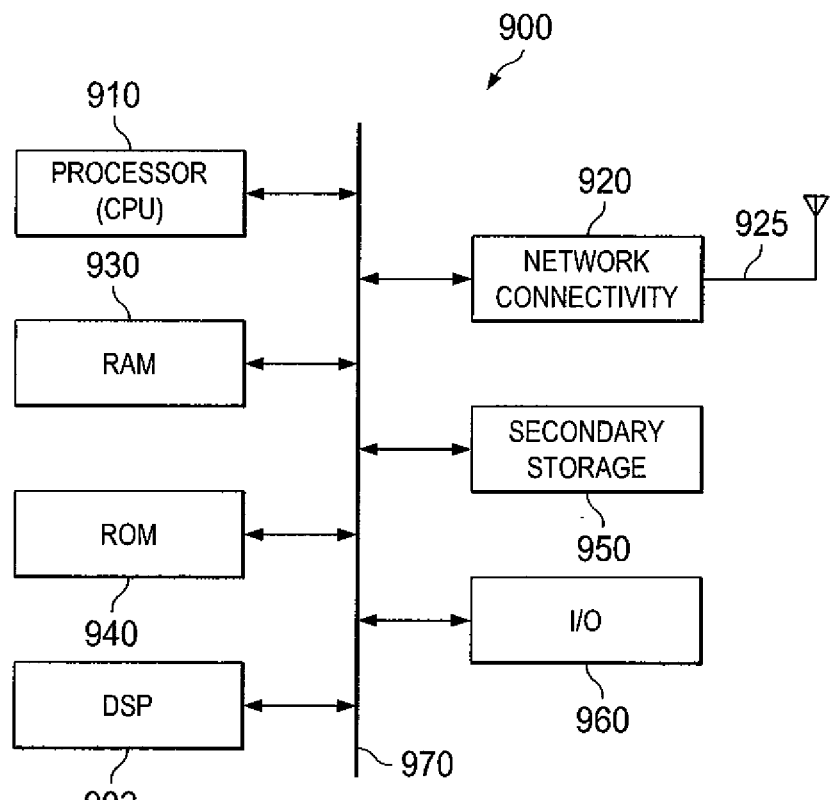
FIG. 9 illustrates a processor and related components suitable for implementing the several embodiments of the present disclosure.

The UE 120 and other components described above might include a processing component that is capable of executing instructions related to the actions described above. FIG. 9 illustrates an example of a system 900 that includes a processing component 910 suitable for implementing one or more embodiments disclosed herein. In addition to the processor 910 (which may be referred to as a central processor unit or CPU), the system 900 might include network connectivity devices 920, RAM 930, read only memory (ROM) 940, secondary storage 950, and input/output (I/O) devices 960. These components might communicate with one another via a bus 970. In some cases, some of these components may not be present or may be combined in various combinations with one another or with other components not shown. These components might be located in a single physical entity or in more than one physical entity. Any actions described herein as being taken by the processor 910 might be taken by the processor 910 alone or by the processor 910 in conjunction with one or more components shown or not shown in the drawing, such as a digital signal processor (DSP) 902. Although the DSP 902 is shown as a separate component, the DSP 902 might be incorporated into the processor 910.

The processor 910 executes instructions, codes, computer programs, or scripts that it might access from the network connectivity devices 920, RAM 930, ROM 940, or secondary storage 950 (which might include various disk-based systems such as hard disk, floppy disk, or optical disk). While only one CPU 910 is shown, multiple processors may be present. Thus, while instructions may be discussed as being executed by a processor, the instructions may be executed simultaneously, serially, or otherwise by one or multiple processors. The processor 910 may be implemented as one or more CPU chips.

The network connectivity devices 920 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, Global System for Mobile Communications (GSM) radio transceiver devices, worldwide interoperability for microwave access (WiMAX) devices, and/or other well-known devices for connecting to networks. These network connectivity devices 920 may enable the processor 910 to communicate with the Internet or one or more telecommunications networks or other networks from which the processor 910 might receive information or to which the processor 910 might output information. The network connectivity devices 920 might also include one or more transceiver components 925 capable of transmitting and/or receiving data wirelessly.

The RAM 930 might be used to store volatile data and perhaps to store instructions that are executed by the processor 910. The ROM 940 is a non-volatile memory device that typically has a smaller memory capacity than the memory capacity of the secondary storage 950. ROM 940 might be used to store instructions and perhaps data that are read during execution of the instructions. Access to both RAM 930 and ROM 940 is typically faster than to secondary storage 950. The secondary storage 950 is typically comprised of one or more disk drives or tape drives and might be used for non-volatile storage of data or as an over-flow data storage device if RAM 930 is not large enough to hold all working data. Secondary storage 950 may be used to store programs that are loaded into RAM 930 when such programs are selected for execution.

The I/O devices 960 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 925 might be considered to be a component of the I/O devices 960 instead of or in addition to being a component of the network connectivity devices 920.

Various combinations of the components of the system 900, including memory, hardware, firmware, software or others may be referred to herein as a "component".

The following are incorporated herein by reference for all purposes: 3GPP TS 36.213, TS 36.331, TS 36.101, and 3GPP contributions R1-103792, R1-102743, R2-103725, and R2-103678.

In an embodiment a UE is provided. The UE comprising at least one component configured to send PH information for each of a plurality of CCs of a carrier aggregation, CC specific configured maximum power information for the CCs, and UE configured maximum power information.

In another embodiment, an access device is provided. The access device comprising at least one component configured to receive PH information for each of a plurality of CCs of a carrier aggregation, CC specific configured maximum power information for the CCs, and UE configured maximum power information regarding a UE.

In another embodiment, a UE is provided. The UE comprising at least one component configured to support a method comprising transmitting a per CC PHR for a plurality of CCs of a carrier aggregation, and transmitting a per UE PHR with the per CC PHR if a triggering event is detected.

In another embodiment, an access device is provided. The access device comprising at least one component configured to support a method comprising receiving at least one of a per CC PHR for a plurality of CCs of a carrier aggregation and a per UE PHR.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
   at least one component to send power headroom (PH) information for each of a plurality of component carriers (CCs) and CC specific configured maximum power information for the CCs, wherein the CC specific configured maximum power information for the CCs comprise a CC specific configured maximum power (PCMAX,j) for each of the CCs that are calculated by the UE,
   wherein the CC specific configured maximum power information for the CCs is sent from the UE using a single medium access control (MAC) control element (CE).

2. The UE of claim 1, wherein the CC specific configured maximum power information for the CCs and the PH information for each of the CCs are sent by the UE to an access device.

3. The UE of claim 1, wherein the at least one component is further configured to set UE configured maximum power information.

4. The UE of claim 3, wherein the UE configured maximum power information comprises a different value with respect to at least one of the number of CCs and the set of CCs used to calculate the maximum power information.

5. The UE of claim 3, wherein the UE configured maximum power information is sent from the UE using higher layer signaling.

6. The UE of claim 3, wherein the UE configured maximum power information comprises a power reduction for carrier aggregation (CPR) per UE, wherein the CPR per UE and a UE maximum power (PPowerClass) are used by the UE to calculate a UE configured maximum power (PUEMAX).

7. The UE of claim 6, wherein the UE configured maximum power information comprises a different value with respect to at least one of the number of CCs and the set of CCs used to calculate the maximum power information.

8. The UE of claim 3, wherein the UE configured maximum power information comprises a UE configured maximum power (PUEMAX) that is determined by the UE.

9. The UE of claim 1, wherein the CC specific configured maximum power information for the CCs comprise power reduction (PR) per CC, wherein the PR per CC (PRj) and a UE maximum power (PPowerClass) that are used by the UE to calculate the CC specific configured maximum power (PCMAX,j) for each of the CCs.

10. The UE of claim 1, wherein CC specific configured maximum power information comprise a value for each CC.

11. The UE of claim 1, wherein CC specific configured maximum power information for the CCs comprise a representative value for all the CCs.

12. An access device, comprising:
    at least one component to receive power headroom (PH) information for each of a plurality of component carriers (CCs) of a carrier aggregation and CC specific configured maximum power information for the CCs, wherein the access device is configured to use the PH information and the CC specific configured maximum power information for each of the CCs to estimate total remaining transmit power for a user equipment (UE),
    wherein the access device receives the CC specific configured maximum power information for the CCs from the UE via a single medium access control (MAC) control element (CE).

13. The access device of claim 12, wherein the CC specific configured maximum power information for the CCs comprise power reduction (PR) per CC, wherein the PR per CC (PRj) and a UE maximum power (PPowerClass) are used by the access device to estimate a CC specific configured maximum power (PCMAX,j) for each of the CCs.

14. The access device of claim 12, wherein the access device is configured to receive UE configured maximum power information comprising a power reduction for carrier aggregation (CPR) per UE, wherein the CPR per UE and a UE maximum power (PPowerClass) are used by the access device to estimate a UE configured maximum power (PUEMAX).

15. The access device of claim 12, wherein the CC specific configured maximum power information comprise a value for each CC.

16. The access device of claim 12, wherein CC specific configured maximum power information for the CCs comprise a representative value for all the CCs.

17. The access device of claim 12, wherein CC specific configured maximum power information for the CCs comprise a differential value for each of the CCs with reference to a primary CC from the CCs.

18. The access device of claim 12, wherein the CC specific configured maximum power information for the CCs comprise a CC specific configured maximum power (PCMAX,j) for each of the CCs that are calculated by the UE.

19. The access device of claim 12, wherein the access device is configured to receive UE configured maximum power information comprising a UE configured maximum power (PUEMAX) that is determined by the UE.

20. The access device of claim 19, wherein the UE configured maximum power information is sent from the UE using higher layer signaling.

21. The access device of claim 12, wherein the CC specific configured maximum power information for the CCs is sent from the UE using higher layer signaling.

22. A method implemented in a user equipment (UE), the method comprising:
    sending power headroom (PH) information for each of a plurality of component carriers (CCs) and CC specific configured maximum power information for the CCs, wherein the CC specific configured maximum power information for the CCs comprise a CC specific configured maximum power (PCMAX,j) for each of the CCs that are calculated by the UE,
    wherein the CC specific configured maximum power information for the CCs is sent from the UE using a single medium access control (MAC) control element (CE).

23. The method of claim 22, further comprising the UE sending the CC specific configured maximum power information for the CCs and the PH information for each of the CCs to an access device.

24. The method of claim 22, wherein the UE is configured to set UE configured maximum power information.

25. The method of claim 24, wherein the UE configured maximum power information comprises a different value with respect to at least one of the number of CCs and the set of CCs used to calculate the maximum power information.

26. The method of claim 22, wherein the CC specific configured maximum power information for the CCs is sent from the UE using a medium access control (MAC) control element (CE).

27. The method of claim 22, wherein CC specific configured maximum power information comprise a value for each CC.

28. A method implemented in an access device, the method comprising:
   receiving power headroom (PH) information for each of a plurality of component carriers (CCs) of a carrier aggregation and CC specific configured maximum power information for the CCs, wherein the access device is configured to use the PH information and the CC specific configured maximum power information for each of the CCs to estimate total remaining transmit power for a user equipment (UE),
   wherein the access device receives the CC specific configured maximum power information for the CCs from the UE via a single medium access control (MAC) control element(CE).

29. The method of claim 28, wherein the CC specific configured maximum power information comprise a value for each CC.

30. The method of claim 28, wherein the CC specific configured maximum power information for the CCs comprise a CC specific configured maximum power (PCMAX,j) for each of the CCs that are calculated by the UE.

\* \* \* \* \*